Figure 1:
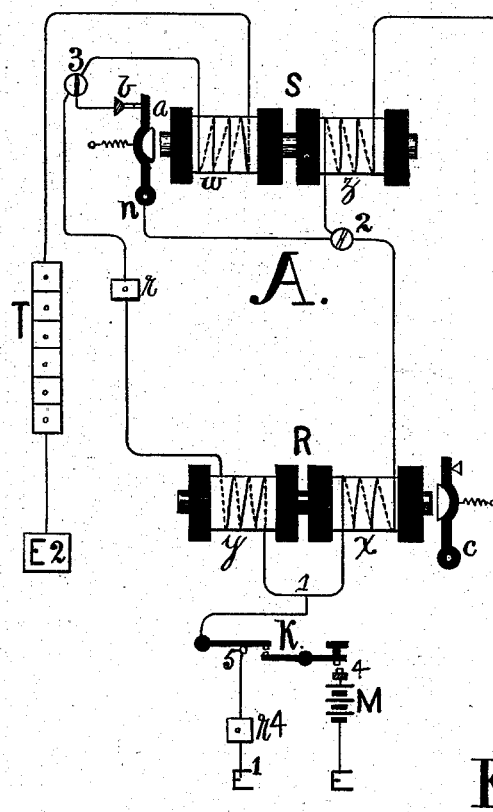
Figure 1:
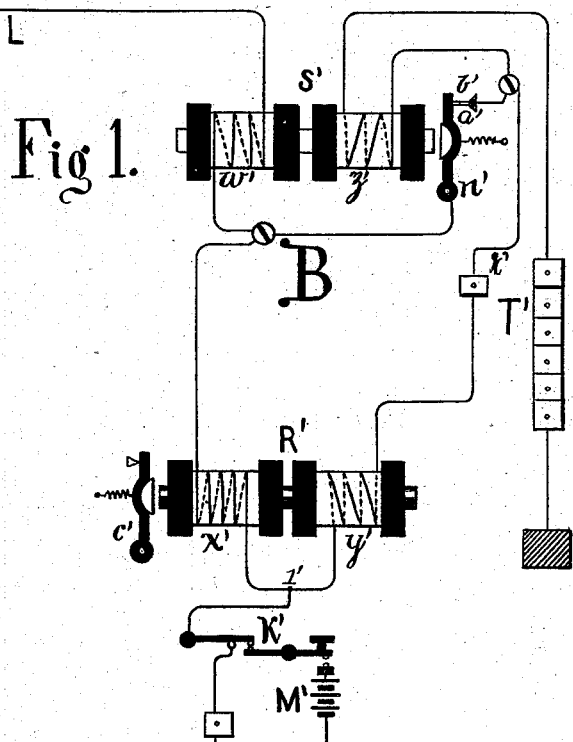

(No Model.)

C. L. BUCKINGHAM.
DUPLEX TELEGRAPH.

No. 258,366. Patented May 23, 1882.

WITNESSES:
W. B. Vansize
Wm. Arnoux

INVENTOR
C. L. Buckingham
BY
ATTORNEY

UNITED STATES PATENT OFFICE.

CHARLES L. BUCKINGHAM, OF ELIZABETH, NEW JERSEY, ASSIGNOR TO THE WESTERN UNION TELEGRAPH COMPANY, OF NEW YORK, N. Y.

DUPLEX TELEGRAPH.

SPECIFICATION forming part of Letters Patent No. 258,366, dated May 23, 1882.

Application filed June 16, 1881. (No model.)

*To all whom it may concern:*

Be it known that I, CHARLES L. BUCKINGHAM, of Elizabeth, county of Union, and State of New Jersey, have invented a new and useful Improvement in Telegraphy, of which the following is a description, reference being had to the accompanying drawings, forming a part hereof.

My invention is applicable to differential systems of telegraphy for the simultaneous transmission of messages upon a single line in opposite directions, and has for its special object the neutralization in the receiving-instruments of duplex, quadruplex, or sextuplex telegraphy of disturbing effects due to static induction upon the main line; and to this end I employ at each station a normally-closed bridge or branch conductor to join the main and artificial lines. The bridge or branch conductor is normally closed through a contact-point and the armature of an electro-magnet, and the position of said armature, whether to open or close the bridge, depends upon the currents which are transmitted by the keys of the home and distant stations. When only signals are being sent from the home station the bridge remains closed, and from this fact equal strengths of current will flow through the two oppositely-wound coils of the home receiving-relay both while the main line is receiving its inductive charge and thereafter, during the continuance of a signal and after the main line has received its full inductive charge.

It is well understood in the art of duplex telegraphy that in a differential duplex while the main line is receiving its inductive charge a stronger current will flow through the main-line coil than through the oppositely-wound coil in the artificial circuit, and that the differential receiving-relay will respond to give a false signal. The bridge, however, which I employ effects a complete balance of currents sent through them from the home station. Following each signal that is sent from the home station is a quick static or inductive discharge from the main line in a direction opposite to that of the current of charge. The direction of the current of inductive discharge is such as to tend to cause the bridge to be broken. However, the armature of the bridge is so adjusted that the bridge will practically remain unbroken from the effects of such inductive discharge, and it will distribute itself in passing to earth equally through the two oppositely-wound coils of the receiving-relay, and no false signal will follow. While the bridge will not be broken by a quick inductive discharge from the main line, a battery-current sent from a distant station sufficiently prolonged to produce a signal at the home station will cause the bridge to be opened and remain open during the signal, wherefore the current will only pass through one coil of the home receiving-relay and a signal will be given. By this means the main-line inductive charge and discharge produce neutral effects upon receiving-relays when signals are sent from the same stations, and this end is accomplished without the necessity of adjustment to change the electro-static capacity of an artificial line to balance the highly-variable inductive effects of the main line.

I will now explain my invention by reference to the accompanying drawings.

Figure 2:
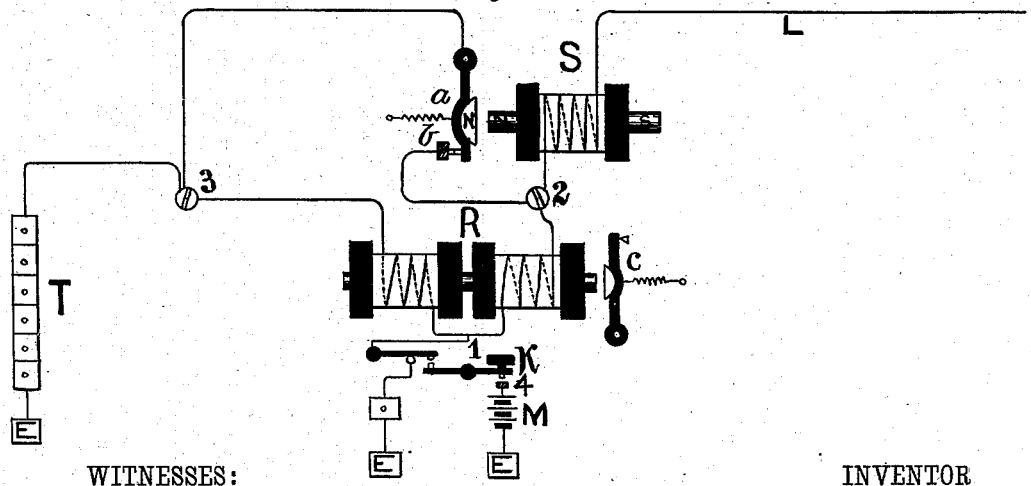

Figure 1 represents an ordinary duplex system in which the bridge at each station is broken by means of an ordinary differential electro-magnet whose coils are in the main and artificial lines, respectively. Fig. 2 shows a modified means for breaking the bridge-conductor, which consists of a polarized relay whose coil is in the main line alone.

In Fig. 1, A and B represent two distant stations, joined by a main line, L.

M and M' are two main-line batteries, arranged to oppose each other when simultaneously connected to line. In all other respects the devices of station B are identical with those of station A, and a description of apparatus of one station will suffice for that of both.

R is an ordinary differential receiving-relay, having oppositely-wound coils $x$ and $y$, forming parts respectively of the main and artificial circuits, and $c$ is its armature-tongue.

K is an ordinary continuity-preserving key.

T is a resistance placed in the artificial circuit equal in amount to the main-line resistance. The artificial line is connected to earth at $E^2$.

S is a differential electro-magnet altogether similar in general respects to relay R, its coils $z$ and $w$ being oppositely wound and forming parts of the main and artificial lines.

2 and 3 are points in the main and artificial lines, joined with a bridge or branch conductor of very low resistance, which is normally closed through armature $a$ and stop $b$.

$r$ is a small rheostat for establishing a proper proportion of resistances of conductors between points 1 and 2 and 1 and 3.

When K is depressed the current of battery M divides at point 1, one portion passing through coils $x$ and $z$ and the other through coils $y$ and $w$ of the relay R and electro-magnet S. When the two portions of the current thus divided are equal the electro-magnetic effects of $x$ and $y$ are neutral, also those of $z$ and $w$; but owing to the greater capacity of the main than the artificial line for a static charge the current from M at the beginning of each signal, if there be no compensating device, will be stronger through coils $x$ and $z$ of the main line than through coils $y$ and $w$ of the artificial circuit. However, if points 2 and 3 be connected by a bridge which is normally closed, it is obvious that until such bridge is broken the current flowing through coil $x$ must equal that passing through $y$, even if the current which flows to the main line from point 2 is much greater than that flowing over the artificial line from point 3 to E². Primarily, therefore, owing to the normally-closed bridge joining points 2 and 3, the current of M will be divided equally through the coils $x$ and $y$; but while the bridge causes an equal division of current between coils $x$ and $y$, more current at the same time will flow through coil $z$ than $w$, whereby S will become magnetic and tend to attract its armature. However, if S be slightly sluggish and armature $a$ properly adjusted, the bridge will not be broken until the main line will have received its inductive charge. After the line has received its inductive charge the current from M will divide itself at 1 equally, and it will be immaterial if the bridge be momentarily broken.

When the resistance of the bridge compared with that of either $x$ or $y$ is practically zero, and resistances of $x$ and $y$ are equal, it will be observed that at the moment of charging the main line, when more current is flowing into said main line than to the artificial circuit, a current will be set up in the bridge from 3 toward 2, and that the division of current at point 1 will be equal through $x$ and $y$.

The removal of battery M after sending each signal is accompanied by a static discharge opposite in direction to the corresponding current of charge. The current of static discharge which would otherwise pass through only coil $x$ of the differential relay R divides equally at point 2, one portion passing to earth by coil $y$ and the other by the oppositely-wound coil $x$, whereby the effects of static discharge are neutral upon the receiving-relay. As the static discharge from the line passes through only one coil of S, it will tend to break the bridge; but by a proper construction of S and adjustment of $a$ the bridge will not be broken before a complete discharge can occur. While the static discharge of the main line is not sufficient to cause the bridge to be broken, a sufficiently-prolonged current from a distant station to make a telegraphic character will attract armature $a$ and retain it during the time of the signal, and the current will thereby pass wholly through coil $x$ to effect a signal. If the batteries M and M' are both simultaneously upon the line, and battery M be then removed, the accompanying static discharge will not neutralize itself by passing through both coils $x$ and $y$, as the bridge is broken when both batteries are to line, and so remains when M is removed. The static discharge under this condition discharges wholly through $x$; but this will produce no false signal by attracting $c$, as $c$ is already attracted from the agency of the closed key at the distant station. The static discharge will therefore only conspire to hold $c$ in its proper position.

I will now describe my modification illustrated in Fig. 2.

S is a relay having a polarized core and a polarized armature-tongue, $a$, for the purpose of breaking and closing the bridge-conductor joining points 2 and 3, the functions of which are fully set forth in the description of Fig. 1. The coil of S is in the main line, and when no current is flowing through said coil the polarized armature $a$ is repelled, as the magnetisms of $a$ and the adjoining end of S are of like polarity—say north. When a current is sent from M the armature is more strongly repelled, as the direction of the current is such as to induce north magnetism in the end of core S facing $a$; but when a current is received from a distant station to effect a signal the armature will no longer be repelled; but the magnetism of the core will be reversed, the armature will be attracted, the bridge will be broken, and a signal received. The retractile force of the armature, however, is so adjusted as not to be materially moved by the static discharge from the line, though its direction be the same as a current giving a signal. By means of the polar circuit-breaker the bridge cannot by any possibility be broken when the line is receiving its inductive charge, as its action is wholly independent of the current of the artificial line. However strong and prolonged the effect of static charge, polar armature $a$ will not be moved and equality of current strength in coils $x$ and $y$ will remain unchanged.

I do not herein claim the combination at each station of a main line, an artificial compensating-circuit, a receiving-instrument, a bridge or branch conductor connecting the main and artificial lines, and an automatic circuit-breaker for opening and closing said bridge, since I shall claim said combination in a separate patent.

What I claim, and desire to secure by Letters Patent, is—

1. The method, substantially as specified, of rendering the receiving-relay of a differential duplex system insensible to the effects of the inductive charge and discharge of the main line, which consists in causing both the inductive charge and discharge respectively to be divided or differentialized through the two oppositely-wound coils of the differential relay.

2. The method, substantially as specified, of rendering the receiving-relay at a transmitting-station in a telegraphic system for simultaneous transmission in opposite directions insensible to the effects of the inductive charge and discharge of the main line, which consists in causing both the inductive charge and discharge respectively through the receiving-instrument at the transmitting-station to be divided before passing through said receiving-relay, whereby the divided portion will act oppositely thereon to produce neutral effects and avoid false signals.

Executed June 13, 1881.

CHARLES L. BUCKINGHAM.

Witnesses:
JOS. E. FENN,
F. L. FOULKS.